Figure 1:
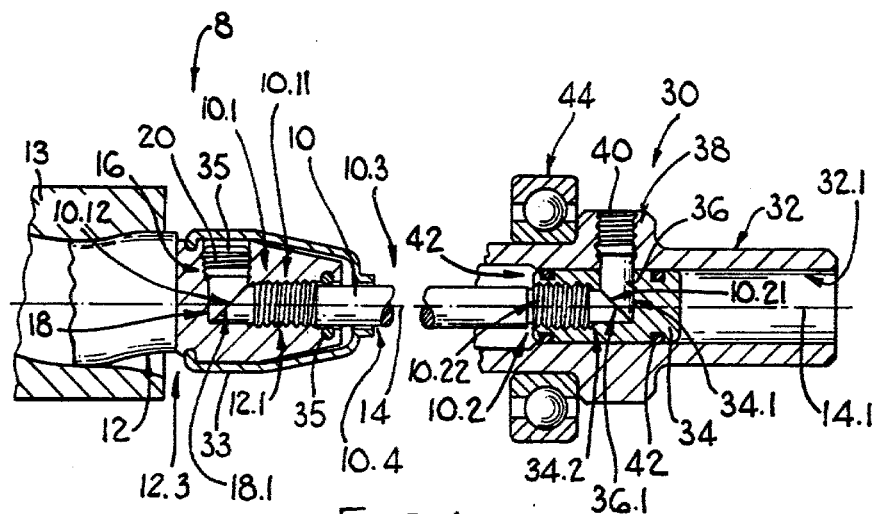

United States Patent [19]

Payne

[11] 4,242,887

[45] Jan. 6, 1981

[54] SHAFT COUPLING

[75] Inventor: Stanley A. E. Payne, Randburg, South Africa

[73] Assignee: Mono Pumps (Africa) (Proprietary) Limited, Edenvale, South Africa

[21] Appl. No.: 17,652

[22] Filed: Mar. 5, 1979

[30] Foreign Application Priority Data

Mar. 9, 1978 [ZA] South Africa ............... 78/1387

[51] Int. Cl.³ ............... F16C 1/06; F16C 1/26
[52] U.S. Cl. ............... 64/4; 64/6; 285/9 M; 285/142; 403/7; 403/231; 403/316
[58] Field of Search ............... 64/4, 6; 403/6, 361, 403/7, 316, 362, 230, 288, 16, 356; 285/9 M, 142, 332.3, 351

[56] References Cited

U.S. PATENT DOCUMENTS

| 1,577,708 | 3/1926 | Gallenkamp | 403/6 |
|---|---|---|---|
| 1,611,912 | 12/1926 | Hleb | 403/7 |
| 2,355,900 | 8/1944 | Beede | 403/316 |
| 2,628,114 | 2/1953 | Paine et al. | 403/230 |
| 2,629,616 | 2/1953 | McVey | 403/362 |
| 2,798,747 | 7/1957 | Auer | 403/288 |
| 3,211,480 | 10/1965 | Eckert | 403/16 |
| 3,864,051 | 2/1975 | Reid | 403/7 |

FOREIGN PATENT DOCUMENTS

| 626942 | 7/1949 | United Kingdom | 403/6 |
|---|---|---|---|
| 1132649 | 11/1968 | United Kingdom | 403/6 |

Primary Examiner—Henry K. Artis
Attorney, Agent, or Firm—Karl W. Flocks

[57] ABSTRACT

A coupling for a flexible shaft for a pump rotor orbiting within a stator. Coupling of the shaft to a driving or driven member is made easily by screwing the end of the shaft by hand into a socket in the member, and by then locking the shaft against rotation in the socket by means of abutting complementary oblique faces at the end of the shaft and at the end of a locking element in a transverse bore intersecting the socket. The screwing in of the shaft into the socket need not be more than fingertight. This permits the use of a shaft of uniform cross section (no flats for spanners) having a smooth surface finish, thereby providing good fatigue life.

21 Claims, 2 Drawing Figures

U.S. Patent  Jan. 6, 1981  4,242,887

SHAFT COUPLING

This invention relates to the coupling of shafts. It relates more particularly to a drive shaft for a pump rotor which orbits inside a pump stator, and to the coupling of such shaft to the pump rotor.

The coupling of a drive shaft to a pump rotor of the kind described, takes place conventionally by means of a universal coupling. The pump then requires substantial axial clearance to enable the shaft to be removed when the pump is being serviced.

It is an object of this invention to provide a shaft with a compact coupling to the pump rotor. A pump equipped with such a shaft and coupling, will require less axial clearance for servicing the pump than other shafts and couplings known to the applicant.

Accordingly, the invention provides a shaft coupling which comprises a shaft having at one end a screw-threaded spigot portion having a thrust surface disposed at an oblique angle to the shaft axis;

a mating member having a screw-threaded socket engaged by the spigot portion and having a transverse socket intersecting the screw-threaded socket;

a locking element within the transverse socket and having a locking surface complementary to the thrust surface urged into abutment with the thrust surface.

The thrust surface may be plane and may intersect the rotary axis at an angle of 45°.

The locking element may extend radially beyond the screw-threaded socket and may be in the form of a plug. There may be provided locking means for urging the thrust and locking surfaces into abutment. The locking means may include a ring around the mating member, the ring having a radial screw-threaded passage alignable with the transverse socket of the mating member; and a screw co-operating with the radial passage and abutting against the radially outer end of the locking element.

The coupling may include a hollow shaft, and the mating member may be in the form of a cylindrical plug axially located within the bore of the hollow shaft. The axial location of the cylindrical plug in the hollow shaft may take place by the locking element engaging with a transverse bore in the hollow shaft, the bore registering with the transverse socket in the mating member. The transverse bore in the hollow shaft may be screw-threaded to accommodate a screw abutting against the radially outer end of the locking element.

Alternatively, the axial location of the cylindrical plug may be provided by a ring around the hollow shaft, and abutment means co-acting with the ring and abutting against the radially outer end of the locking element.

The invention extends also to a shaft and pump rotor assembly comprising a coupling as described, the mating member being in the form of a pump rotor adapted to orbit inside a pump stator, and the shaft being adapted to flex when the pump rotor orbits in the pump stator during operation.

Preferably, there may be provided at the other end the shaft opposite the screw-threaded spigot portion, another coupling as described, comprising a hollow shaft. Such hollow shaft may be rotatably supported by at least one bearing positioned axially between the shaft couplings. If desired, the hollow shaft may be rotatably supported by two bearings axially spaced from each other and both positioned axially between the shaft couplings.

The invention extends also to a shaft adapted to form part of the assembly as described.

The invention will now be described by way of example with reference to the accompanying diagrammatic drawings.

In the drawings

Figure 2:
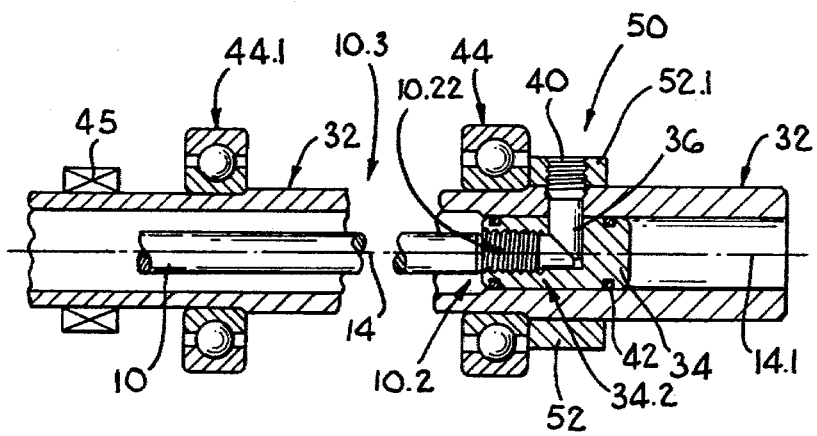

FIG. 1 shows an axial section of a drive shaft coupled at its opposite ends in accordance with the invention; and FIG. 2 shows an axial section of a modification of one of the couplings shown in FIG. 1.

Referring to the drawings, reference numeral 8 refers generally to a shaft coupling comprising a shaft 10 having at one end 10.1, a screw-threaded spigot portion 10.11 having at its end a thrust surface 10.12 disposed at an oblique angle to the shaft axis 14. The shaft coupling further comprises a mating member in the form of a pump rotor 12 which is rotatably mounted to orbit inside a stator 13. The rotor 12 has a screw-threaded socket 12.1 engaged by the spigot portion 10.11 of the shaft 10. The rotor 12 further has a transverse socket 16 intersecting the screw-threaded socket 12.1. The shaft coupling also comprises a locking element 18 within the transverse socket 16. The locking element 18 has a locking surface 18.1 complementary to the thrust surface 10.12 of the shaft. Finally, the shaft coupling comprises locking means in the form of a screw 20 adapted to abut against the radially outer end of the locking element 18 and to urge it into the transverse socket, such that the complementary thrust and locking surfaces 10.12 and 18.1 are in abutment.

The thrust surface 10.12 intersects the shaft axis at an angle of 45°. On the righthand side of FIG. 1 of the drawings, there is shown another embodiment of a coupling in accordance with the invention, generally indicated by reference numeral 30. The coupling 30 comprises a hollow shaft 32, a mating member in the form of a cylindrical plug 34 axially located within the bore 32.1 of the hollow shaft by means of a locking element 36 engaging with a transverse bore 38 in the hollow shaft and intersecting the bore 32.1 of hollow shaft 32. The transverse bore 38 is alignable with the transverse bore 34.1 intersecting the screw-threaded socket 34.2 in the cylindrical plug 34. Like the screw-threaded spigot portion 10.11 at the end 10.1, the shaft 10 has a screw-threaded spigot formation 10.22 at its other end 10.2 which has a thrust surface 10.21 intersecting the axis 14 of the shaft 10 at an angle of 45°. The locking element 36 has a complementary locking surface 36.1 which is adapted to abut against the thrust surface 10.21 when its radially outer end is urged towards the face 10.21 by the locking means in the form of a screw 40.

In order to seal off the cylindrical plug 34 in the bore 32.1, O-rings 42 are provided. The hollow shaft is rotatably supported about its axis 14.1 by means of an anti-friction bearing 44.

The coupling 8 may be sealed off from liquid being pumped by means of a boot 33 engaging sealingly with a groove 12.3 in the rotor 12, and with the shaft 10 at a zone 10.4.

Alternatively or in addition, O-ring seals 35 may be provided at the mouth of socket 12.1 and of the transverse socket 16. Such O-rings seals will engage sealingly with the shaft 10 and with the outer end of the screw 20.

The screw-threaded spigot portion 10.22 can also be sealed off by an O-ring around the shaft 10 and within the mouth of the socket 34.2. The arrangement will be similar to that described for the seals 35.

Referring now to FIG. 2 of the drawings, there is shown a modification 50 which is similar in construction to the coupling 30 of FIG. 1, the only difference being that the locking means comprises a ring 52 having a screw-threaded passage 52.1 adapted to accommodate a screw 40 which is adapted to abut against the radially outer end of the locking element 36.

The other end of the shaft 10 of the embodiment shown in FIG. 2, will have a coupling similar to that indicated by reference numeral 8 in FIG. 1. A further anti-friction bearing 44.1 is provided to support the hollow shaft 42. The end 32.3 of the hollow shaft 32 beyond the bearing 44.1 rotates within a gland 45.

In operation, the hollow shaft 32 will rotate about its axis 14.1, being supported rotatably about such axis by the bearings 44 and 44.1. During rotation the axis 14 of the shaft 10 will generate a generally conical surface, the apex of the cone being at the end 10.2. The hollow shaft 32 will permit the ends 10.1 and 10.2 of the shaft to be screwed by hand into the screw-threaded sockets 12.1 and 34.2.

Hand tools will not be necessary for screwing the shaft into the sockets. Once the ends 10.1 and 10.2 have been screwed into the sockets then the locking elements 18 and 36 are inserted, and the screws 20 and 40 are screwed home. The locking surfaces 18.1 and 36.1 of the locking elements 18 and 36 will bear up against the thrust surfaces 10.12 and 10.21 at the ends of the shaft 10. The locking elements 18 and 36 will urge the ends 10.1 and 10.2 axially out of the sockets 12.1 and 34.2 and will also urge them transversely to the shaft axis 14. Such urging will ensure that the screw-threaded spigot portions 10.11 and 10.22 will lock in their respective screw-threaded sockets 12.1 and 34.2. The abutting complementary surfaces 18.1 and 10.12 on the one hand and 10.21 and 36.1 on the other hand will prevent the shaft 10 from turning in the sockets 12.1 and 34.2. The locking element 36 also ensures that the cylindrical plug 34 will not rotate relative to the hollow shaft 32. In this respect, the locking element 36 acts like a key.

Because of the compactness of the coupling 8, the axial clearance required to permit uncoupling and removal of the shaft 10 from the rotor 12 can be of the order of 50 mm. This is much less than the axial clearance required for conventional installations, in which the axial clearance required may be about the same length as the flexible shaft. The smaller axial clearance required with shafts and couplings according to the invention, affords great savings in space in factories where pumps of this kind are to be used. After removal of the screw 20 the shaft 10 may be unscrewed from the rotor 12. The stator 13 and rotor 12 can then be moved axially away from the end 10.1 of the shaft 10 an amount of about 50 mm only. The stator and rotor can then be moved transversely to the axis 14 of the shaft to permit the withdrawal of the shaft 10 when the coupling 30 or 50 has been disconnected.

Shafts 10, in pumps of the kind described, flex during operation and are subject to fatigue. It is important therefore that they should have an unblemished surface finish. The method of coupling provided by this invention ensures that such shafts can be of substantially uniform cross section, and can be screwed into sockets without using hand tools. Accordingly, such shafts can be installed and taken out by hand during servicing of pumps without it being necessary to damage the surface finish. It is a great advantage in servicing this type of pump and ensures that maximum effective life can be obtained from flexible drive shafts in installations of this kind.

If desired, the central portion 10.3 of the shaft 10 between the couplings 8 and 30, or 8 and 50, may have a diameter at the most equal to the diameter at the bottom of the thread of the screw-threaded spigot portions.

The invention accordingly extends to a pump shaft having an oblique face at each end, and having a screw-threaded spigot portion inwardly from each oblique face.

The shaft may be of uniform circular section between the screw-threaded spigot portions and may have a smooth outer surface.

The couplings 30 and 50 may be provided with seals similar to the seals 35 in coupling 8.

In order to protect the surface finish of the shaft against physical damage, the central portion 10.3 may be coated with a coat of synthetic plastics material which is inert to chemical attack. The coat thickness may be up to one-twentieth the diameter of the shaft. Suitable plastics materials available in the trade are NYLON and a material known in the trade as KYNAR.

The angle at which the thrust surface 10.12 intersects the axis 14 of the shaft 10 may be steeper than 45°. This will then ensure that a greater axial thrust is imparted to the shaft by the locking element 18, by means of a wedging action. Similarly, the thrust surface 10.21 may be at a steeper angle than 45°, for a similar reason.

The sockets 12.1 and 16 need not necessarily be at right angles to each other but may be arranged to intersect such that an obtuse angle is defined between their axes. The screw 20 and plug 18 may then be integral, the face 18.1 being then at right angles to the axis of the screw 20. In other words, the locking element and locking means may be made integrally with each other. Such an arrangement may require slightly more space than the embodiments illustrated but will nonetheless afford savings in axial space requirements over other constructions known to the applicant. When the locking element and locking means are so integrally made with each other then the locking means will be provided by the screw threads of the plug and screw combination.

What I claim is:

1. A shaft coupling comprising
   a shaft having at one end a screw-threaded spigot portion having a thrust surface disposed at an oblique angle to the shaft axis;
   a mating member having a screw-threaded socket engaged by the spigot portion and having a transverse socket intersecting the screw-threaded socket;
   a locking element within the transverse socket and having a locking surface complementary to the thrust surface urged into abutment with the thrust surface.

2. A coupling as claimed in claim 1, in which the thrust surface intersects the shaft axis.

3. A coupling as claimed in claim 1, in which the locking element extends radially beyond the screw-threaded socket.

4. A coupling as claimed in claim 1, in which the locking element is in the form of a plug, and in which there is provided locking means for urging the thrust and locking surfaces into abutment, the locking means including a screw engaging with a female screw thread in the transverse socket.

5. A coupling as claimed in claim 1, in which the locking element is in the form of a plug, and in which there is provided locking means for urging the thrust and locking surfaces into abutment, the locking means including a ring around the mating member, the ring having a radial screw-threaded passage alignable with the transverse socket of the mating member; and a screw co-operating with the radial passage and abutting against the radially outer end of the locking element.

6. A coupling as claimed in claim 1, which includes a hollow shaft, and in which the mating member is in the form of a cylindrical plug axially located within the bore of the hollow shaft.

7. A coupling as claimed in claim 6, in which the axial location of the cylindrical plug takes place by the locking element engaging with a transverse bore in the hollow shaft, the bore registering with the transverse socket in the mating member.

8. A coupling as claimed in claim 7, in which the transverse bore in the hollow shaft is screw-threaded, and in which there is provided a screw co-operating with the screw thread in the transverse bore of the hollow shaft, the screw abutting against the radially outer end of the locking element.

9. A coupling as claimed in claim 7, in which there is provided a ring around the hollow shaft, and abutment means coacting with the ring and abutting against the radially outer end of the locking element.

10. A shaft and pump rotor assembly comprising the combination of a coupling as claimed in claim 1, the mating member being in the form of a pump rotor adapted to orbit inside a pump stator, and the shaft being adapted to flex when the pump rotor orbits in the pump stator during operation.

11. An assembly as claimed in claim 10, in which there is provided a seal around the shaft at the mouth of the screw-threaded socket in the rotor.

12. An assembly as claimed in claim 10, in which there is provided a resilient boot around the coupling and engaging sealingly with the rotor and with the shaft to close off the mouth of the screw-threaded socket and the transverse socket.

13. An assembly as claimed in claim 10, in which there is provided, at the other end of the shaft opposite the spigot portion, a further coupling as claimed in claim 6.

14. An assembly as claimed in claim 13, in which the hollow shaft is rotatably supported by at least one bearing positioned axially between the shaft couplings.

15. An assembly as claimed in claim 13, in which the hollow shaft is rotatably supported by two bearings axially spaced from each other and both positioned axially between the shaft couplings.

16. A flexible shape adapted to form part of the assembly as claimed in claim 10.

17. A flexible pump shaft having an oblique face at each end, and a screw-threaded spigot portion inwardly from each oblique face.

18. A pump shaft as claimed in claim 17, in which the central portion between screw-threaded spigot portions has a smooth outer surface and is of uniform circular section.

19. A pump shaft as claimed in claim 18, in which the central portion has a diameter at the most equal to the diameter at the bottom of the thread of the screw-threaded spigot portions.

20. A pump shaft as claimed in claim 19, in which the central portion has a protective coat of synthetic plastics material which is substantially inert to chemical attack.

21. A flexible drive shaft having:
a. first and second ends;
b. an oblique face on at least said first end;
c. a screw-threaded spigot portion inwardly from said oblique face on said shaft; and
d. coupling means at said second end of said shaft adapted to transmit torque to or from said shaft.

* * * * *